United States Patent [19]
Duley

[11] Patent Number: 5,668,463
[45] Date of Patent: Sep. 16, 1997

[54] AUXILIARY BATTERY CHARGE CONTROL CIRCUIT

[75] Inventor: Raymond S. Duley, Buda, Tex.

[73] Assignee: Advanced Micro Devices, Inc., Sunnyvale, Calif.

[21] Appl. No.: 279,294

[22] Filed: Jul. 22, 1994

[51] Int. Cl.$^6$ .............................. H02J 7/00; H01M 10/46
[52] U.S. Cl. ................................ 320/15; 320/49; 307/66
[58] Field of Search ................................... 320/13, 14, 15, 320/16, 39, 49; 307/66

[56] References Cited

U.S. PATENT DOCUMENTS

| | | | |
|---|---|---|---|
| 5,028,806 | 7/1991 | Stewart et al. | 307/66 |
| 5,155,428 | 10/1992 | Kang | 320/13 |
| 5,167,024 | 11/1992 | Smith et al. | |

FOREIGN PATENT DOCUMENTS

| | | |
|---|---|---|
| A-0 187 369 | 7/1986 | European Pat. Off. |
| WO-A-82-04345 | 9/1982 | WIPO |

OTHER PUBLICATIONS

"Static n–Mos Ram Idles On the trickle current", F.A. Scherpenberg, Electronics International, vol. 53, No. 2, Jan. 27, 1981, New York, pp. 129–132, XP002012803.

*Primary Examiner*—Peter S. Wong
*Assistant Examiner*—Patrick B. Law
*Attorney, Agent, or Firm*—Kevin L. Daffer; Conley, Rose & Tayon

[57] ABSTRACT

A circuit is provided for controlling charge (or discharge) of an auxiliary battery using an auxiliary battery charge control circuit of improved design. The auxiliary battery charge control circuit is coupled between an auxiliary battery and a main battery for regulating charge and discharge of the auxiliary battery. The auxiliary battery control circuit includes a pair of voltage dividers coupled between ground potential and the main battery, and a pair of comparators having a mutually connected output. The inputs of the pair of comparators are connected to a reference voltage and the pair of voltage dividers. The output of the comparators is connected to a switch transistor, and the switch transistor modulates a battery connected transistor coupled between the main battery and the auxiliary battery. When the main battery voltage exceeds a maximum voltage level or is less than a minimum voltage level, then the comparators turn off the switch transistor, and the switch transistor correspondingly turns off the battery connected transistor causing disconnect of the main battery from the auxiliary battery. Conversely, if the main battery voltage is between the upper and lower voltage limits, then comparator output will cause switch transistor and battery connect transistor to turn on thereby connecting main battery to the auxiliary battery. A reference voltage and resistor values within voltage divider networks are chosen according to user-defined application for setting the upper and lower voltage limits necessary for connecting or disconnecting auxiliary battery from main battery.

8 Claims, 1 Drawing Sheet

AUXILIARY BATTERY CHARGE CONTROL CIRCUIT

BACKGROUND OF THE INVENTION

1. Field of the Invention

This invention relates to a portable electronic device which requires auxiliary battery backup and more particularly to a circuit for controlling charge (and discharge) of the auxiliary battery.

2. Description of the Relevant Art

A portable electronic device can be powered from several sources. When available, electronic devices are powered from an AC power supply. Portable electronic devices, however, generally utilize power management architecture and can be powered from a self-contained source such as a battery. Portable electronic devices such as laptop computers, employ sophisticated power management for reducing power consumption during times in which the portable device is not fully utilized. Thus, power management implies standby, suspend and off modes of operation depending upon how much of the portable device is being used. Power management is generally described in U.S. Pat. No. 5,167,024 to Smith, et al. (incorporated herein by reference). Power management of a low power portable device has made prevalent use of a battery as the device's main power source when the AC power supply is unavailable. The battery can maintain delivery of power for several hours depending upon the device's mode of operation. If fully operational, the device will discharge the battery faster than it would if in suspend, standby or off states.

The battery not only serves as the main power source when AC power is unavailable, but also must maintain the memory states of any dynamic RAM memory within the portable device. If, for example, the portable device employs dynamic RAM (DRAM), then the DRAM must be periodically refreshed. If not refreshed, the stored states within DRAM will be lost. It is therefore crucial that the battery maintain enough power to periodically refresh DRAM.

A portable device is oftentimes operated for several hours from a battery source. During operation, the battery source can discharge to significantly low levels. After prolonged operation, the battery may discharge well below a minimum level necessary to maintain DRAM refresh rate. It is therefore important that a minimum charge be maintained to ensure retainage of DRAM state.

Many modern portable electronic devices use an auxiliary battery in addition to a main battery. The main battery provides a main source of power for operating the portable device when AC power is unavailable. The main battery is therefore much larger than and provides greater amounts of power than the auxiliary battery. The auxiliary battery is therefore primarily used for maintaining DRAM state and not for powering the portable device. Unfortunately, however, when the main battery becomes unduly discharged, is disconnected or fails, the auxiliary battery will attempt to power the portable device. The auxiliary battery, however, will not be able to maintain operation power for long periods of time and, if called upon to do so, the auxiliary battery will discharge below a minimum level necessary to refresh DRAM.

FIG. 1 illustrates an exemplary configuration for powering a DRAM-based portable electronic device 10. Electronic device 10 receives power from an AC power source 12, when available. When absent an AC power source 12, electronic device 10 receives power from a main battery 14. Main battery 14 receives trickle charge from an available AC power supply 12 through resistor 16 placed in parallel with diode 18. When AC power supply 12 is removed, main battery 14 provides operational power through diode 18 to device 10. Main battery 14 (or AC power source 12) provide trickle charge through resistor 20 to auxiliary battery 22.

As described above, auxiliary battery 22 tries to charge main battery 14 when main battery 14 is overdischarged, or when auxiliary battery 22 charge is greater than main battery 14 charge. As defined herein, "overdischarge" refers to a discharge less than 0.8 volts per cell when employing NiMH or NiCAD battery cells. Auxiliary battery 22 will become overdischarged if it tries to charge an overly discharged main battery 14 through diode 24. Overdischarge of main battery 14 can be caused by several reasons, including one or more defective cells within main battery 14, or by failure in detecting an overdischarged condition of main battery 14.

Prior art auxiliary battery charge control circuit 26 (shown encompassed in dashed lines) suffers numerous disadvantages, some of which are described above. While circuit 26 provides trickle charge to auxiliary battery 22 during times in which AC power source 12 is present, or when main battery is adequately charged, it does not provide for cessation of discharge of auxiliary battery when AC source is absent and/or when main battery is overdischarged. Thus, circuit 26 is not designed to prevent overdischarge of auxiliary battery 22 below safe levels necessary to maintain DRAM status.

SUMMARY OF THE INVENTION

The problems outlined above are in large part solved by the improved auxiliary battery charge control circuit of the present invention. The charge circuit hereof is purposefully designed to cease discharge of the auxiliary battery at a state above a minimum value necessary to maintain DRAM status. Specifically, the improved control circuit disconnects the auxiliary battery from the main battery whenever the main battery demands discharge of the auxiliary battery below a safe voltage level. During times in which the main battery is adequately charged, the auxiliary battery maintains its connection thereto in order to allow trickle charge from the main battery to the auxiliary battery.

Broadly speaking, the present invention contemplates a charge control circuit. The control circuit comprises an auxiliary battery, a main battery and an AC-to-DC converter connected in parallel with each other and in parallel to a load device. As defined herein, "load device" is a portable electronic device which consumes current (and/or power) and requires an operating voltage during times of full operation, and a lesser operating voltage during standby or suspend states of operation. The suspend state can be powered by either the main battery or the auxiliary battery. The charge control circuit further includes a main battery charge control circuit connected between the main battery and the AC-to-DC adapter. The main battery charge control circuit provides a current from the AC-to-DC adapter to the main battery. The control circuit still further includes an auxiliary battery charge control circuit connected between the auxiliary battery and the main battery. The auxiliary battery charge control circuit provides current to and from the main battery, as well as to the load, and thereby modulates connectivity therebetween.

The auxiliary battery charge control circuit comprises a pair of voltage dividers coupled between a ground potential and the main battery. Also included is a pair of comparators. Each comparator has an output connected to the other comparator output and a pair of inputs connected to a reference voltage and a respective one of the pair of voltage dividers. The auxiliary battery charge control circuit also includes a switch transistor having a base and switch transistor conductive path. The base is connected to the mutually coupled comparator outputs and the switch transistor conductive path is modulated by the base and is connected between a current limiting resistor and the ground potential. A battery connect transistor is also included having a base and a battery connect conductive path. The base of the battery connect transistor is connected through the current limiting resistor to the switch transistor conductive path. The battery conductive path is connected between the auxiliary battery and the main battery. Changes in conductivity of the switch transistor conductive path correspondingly cause changes in conductivity between the auxiliary battery and the main battery.

The pair of voltage dividers comprise a first voltage divider and a second voltage divider. The first voltage divider comprises a first pair of divider resistors connected together by first divider node and the second voltage divider comprises a second pair of divider resistors connected together by a second divider node. The first divider node is connected to the inverting input of one of the pair of comparators, and the second divider node is connected to the non-inverting input of the other of the pair of comparators. The first divider node is at a first divided voltage greater than a second divided voltage upon the second divider node. The connectivity between the auxiliary battery and the main battery is maximum during times in which the voltage levels upon the first divider node and the second divider node are less than and greater than, respectively, the reference voltage.

The present invention further contemplates a circuit for charging and discharging an auxiliary battery and for disconnecting the auxiliary battery from a main battery. The charging and discharging circuit comprises a auxiliary battery and a main battery connected to a load device. A series-connected diode and a resistor are connected between the auxiliary battery and the main battery for charging the auxiliary battery from the main battery during times in which the voltage upon the main battery exceeds by a threshold amount of voltage upon the auxiliary battery. The charging and discharging circuit further includes an auxiliary battery charge control circuit connected between the main battery terminal and the auxiliary battery terminal for discharging an inserted auxiliary battery during times in which a voltage upon the main battery terminal is within a range less than the voltage upon the auxiliary battery terminal, and disconnecting terminals between the auxiliary battery and the main battery during times in which a voltage upon the main battery terminal exceeds a threshold amount above the voltage upon the auxiliary battery terminal and is less than a threshold amount above a ground potential. The auxiliary battery charge control circuit comprises a first and a second voltage divider coupled in parallel between the ground potential and the main battery. The auxiliary battery charge control circuit further comprises a first and a second comparator having a mutually coupled output. The first comparator includes an inverting input adapted to receive a first divided voltage from the first voltage divider and the second comparator includes a non-inverting input adapted to receive a second divided voltage from the second voltage divider. The auxiliary battery charge control circuit still further includes a switch transistor having a base and a switch transistor conductive path. Changes in conductivity of the switch transistor conductive path correspondingly cause changes in connectivity between the auxiliary battery and the main battery.

BRIEF DESCRIPTION OF THE DRAWINGS

Other objects and advantages of the invention will become apparent upon reading the following detailed description and upon reference to the accompanying drawings in which.

Figure 1:
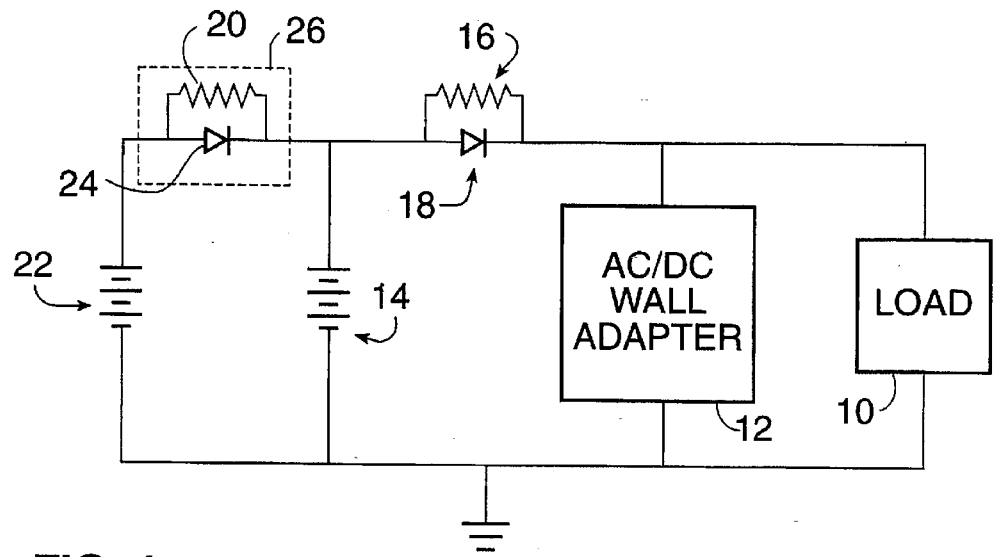
FIG. 1 is a circuit for controlling charge (or discharge) of an auxiliary battery using an auxiliary battery charge control circuit of prior art design.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
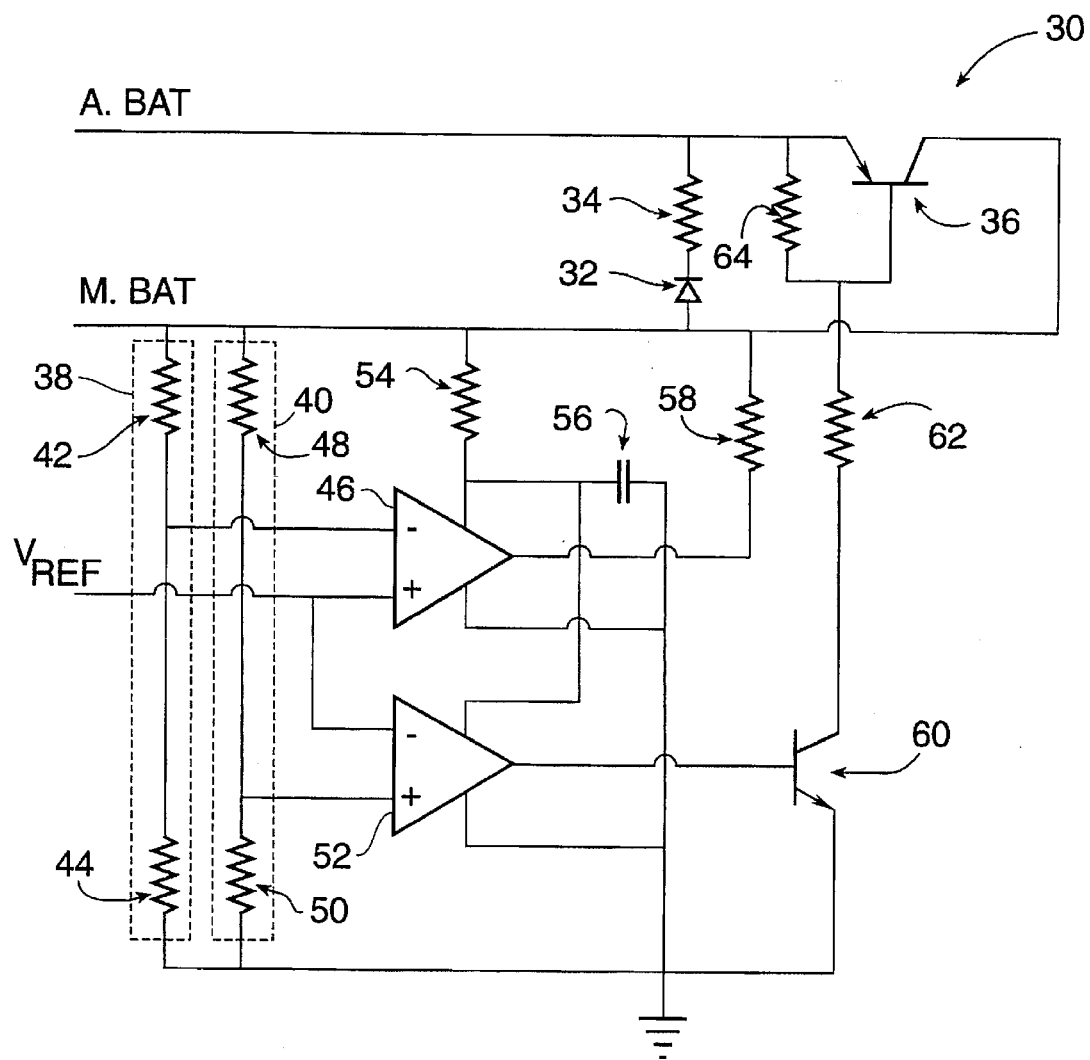
FIG. 2 is a auxiliary battery charge control circuit according to the present invention.

Turning now to FIG. 2, an improved auxiliary battery charge control circuit 30 is shown. Charge control circuit 30 can be substituted for prior design charge control circuit 26, shown in FIG. 1, to make up a circuit or system for controlling charge (or discharge) of an auxiliary battery. Circuit 30 allows main battery charge current to move from main battery terminal (M. BAT.) to the auxiliary battery terminal (A. BAT.) through diode 32 and series-connected resistor 34. In order to receive a charge through resistor 34 and diode 32, the voltage upon the main battery terminal must be at least a threshold (diode threshold) more positive than the voltage upon the A. BAT. In most instances, M. BAT. voltage is greater than A. BAT. voltage thereby forward biasing diode 32 and trickle charging A. BAT. from M. BAT. However, if the M. BAT. unduly discharges at a level less than a threshold above the auxiliary battery level, then diode 32 turns off, and any connectivity between main battery and auxiliary battery occurs through battery connect transistor 36. Modulation of transistor 36 is determined by the voltage level of M. BAT., as will be described below. As set forth hereinbelow, M. BAT., main battery, and main battery terminal are used interchangeably. Further, A. BAT., auxiliary battery, and auxiliary battery terminal are used interchangeably.

Coupled between the main battery and ground potential is a first voltage divider 38 and a second voltage divider 40. Connected at a first divider node between resistive elements 42 and 44 is an inverting input of a first comparator 46. Likewise, connected at a second divider node between resistive elements 48 and 50 of second voltage divider 40 is the non-inverting input terminal of second comparator 52. The non-inverting input of first comparator 46 is coupled to the inverting input of second comparator 52, all of which is connected to a reference voltage ($V_{REF}$). The reference voltage can derived from common techniques using, for example, bandgap voltage reference integrated circuits or a zener diode having the anode side connected to a ground terminal and the cathode side connected to a reference voltage ($V_{ref}$). A limiting resistor is used with the zener diode and is generally coupled between the cathode and $V_{ref}$. The cathode is therefore fixed at or near $V_{ref}$.

First and second comparators 46 and 52, respectively, are each coupled between main battery and ground potential. Main battery provides power through resistive element 54 to first comparator 46. A capacitor is linked between the upper power rail and lower power rail of first comparator 46 and second comparator 52 to provide a low pass filter of any transient noise upon the main battery terminal such that the noise is filtered from the power (and ground) terminals of comparators 46 and 52.

The outputs of first and second comparators 46 and 52 are coupled together on one side of a pull-up resistor 58 and the base of switch transistor 60. The conductive path of switch transistor 60 is coupled through resistor 62 to the base of battery connect transistor 36. Coupled between the base and emitter nodes of transistor 36 is pull-up resistor 64.

Operation of auxiliary battery charge control circuit 30 is best understood by first determining the voltage potential upon main battery which would cause battery connect transistor 36 to turn off. It is important that transistor 36 turn off whenever main battery voltage exceeds a maximum amount ($V_{MAX}$) or is less than a minimum amount ($V_{MIN}$). As used hereinbelow, the terms maximum amount and $V_{MAX}$ are interchangeable, and the terms minimum amount and $V_{MIN}$ are interchangeable. A main battery voltage which exceeds a maximum amount is indicative of a main battery which is providing power to the electronic device without need of auxiliary battery connection. A main battery voltage less than a minimum amount indicates a possible defective main battery or that the main battery is being replaced. At such times, the auxiliary battery is disconnected from the main battery to prevent over discharge of the auxiliary battery into the main battery or electronic device load.

The maximum and minimum voltage values for the main battery, above which or below which a disconnection occurs, is set as a proportionate amount the reference voltage ($V_{REF}$). Using voltage division network analysis and operable characteristics of comparators, voltage upon first divider node (at the inverting input of first comparator 46) necessary to drive the output of comparator 46 to ground is as follows:

$$(V_{M.\ BAT.} \times R_{44}) / (R_{42}+R_{44}) > V_{REF}$$

$R_{42}$ and $R_{44}$ indicate the resistive values for resistor 42 and resistor 44, as designated in FIG. 2. To provide a ground level output from comparator 52, the second divider node (at the non-inverting input of comparator 52) must be as follows:

$$(V_{M.\ BAT.} \times R_{50}) / (R_{50}+R_{48}) > V_{REF}$$

$R_{50}$ and $R_{48}$ designate resistors 50 and 48, as shown in FIG. 2.

Manipulation of the above formulas produce the following result:

$$V_{M.\ BAT.} > V_{REF} \times (R_{42}+R_{44}) / R_{44}, \text{ and}$$

$$V_{M.\ BAT.} < V_{REF}(R_{48}+R_{50}) / R_{50}$$

In the above formulas, $V_{REF}$ ($R_{42}+R_{44}$) / $R_{44}$ is equal to an upper voltage level ($V_{MAX}$). The term $V_{REF}$ ($R_{48}+R_{50}$) / $R_{50}$ is equal to a minimum voltage level ($V_{MIN}$). Thus, if main battery voltage exceeds an upper voltage limit, then switch transistor will turn off. Likewise, if main battery voltage is less than a lower voltage limit, then switch transistor 60 will turn off. In either instance (main battery exceeding an upper voltage limit or less than a lower voltage limit) switch transistor 60 will cause a disconnect.

According to one embodiment, the auxiliary battery comprises five batteries connected in series, each battery is 1.2 volts nominal. According to one embodiment, the main battery comprises ten batteries connected in series, each battery is 1.2 volts nominal. Using as an example reference voltage ($V_{REF}$) of 2.5 volts, upper voltage limit can be adjusted at any value, an exemplary value being 7 volts, and lower voltage limit exemplary value being 5 volts. The voltage values for upper and lower voltage limits can be set according to the ratio of chosen resistor values 42, 44, 48 and 50. Thus, resistor values can vary to define an upper and lower voltage limit relative to the reference voltage. The upper voltage limit is preferably chosen as being one volt less than the over discharged state of the main battery. If the main battery utilizes ten cells, and each cell has an overdischarged state of 0.8 volts, then the main battery achieves overdischarge at 8 volts, whereby the upper voltage limit is preferably set at 7 volts (i.e., one volt less than the overdischarge value). The lower voltage limit ($V_{MIN}$) is generally set at the minimum value at which the auxiliary battery can maintain DRAM logic state. Thus, if DRAM loses logic state less than 5 volts, then the lower voltage limit is set at 5 volts. The lower voltage limit is therefore set at the minimum value at which the portable product can maintain voltage regulation. It is appreciated from the illustration of FIG. 2 that upper and lower voltage limits can be easily set by changing resistor values in the first and second voltage dividers 38 and 40. If voltage on main battery is between the upper and lower voltage limits, then an open circuit (or high impedance) occurs at the output of each comparator 46 and 52. The high impedance status is pulled to upper levels by resistor 58 causing switch transistor 60 to turn on as well as battery connect transistor 36. Accordingly, main battery voltage between the upper and lower level limits causes connectively of main battery to auxiliary battery. When transistor 60 and 36 are on, resistor 62 limits base current in transistor 36 and resistor 64 pulls up transistor 36 base to ensure that transistor 36 is off when transistor 60 is off.

The present advantage of auxiliary battery charge control circuit 30 is that it is capable of supplying power to a portable electronic device when the main battery voltage is between an upper and lower voltage limit ($V_{MAX}$ and $V_{MIN}$). The auxiliary battery does not power either the main battery or the portable electronic device when the main battery is in an overdischarge state (i.e., below $V_{MIN}$). Furthermore, when the auxiliary battery is supplying power to the system, there is no series diode drop of voltage between the auxiliary battery and the main battery terminals as in exemplary prior battery charge control circuits. As such, the auxiliary battery charge control circuit hereof avoids waste of power and decreases its output voltage. When auxiliary main battery terminals are connected, the only voltage drop is through a fully saturated transistor (i.e., battery connect transistor 36). Voltage drop across the saturated transistor is generally less than 0.1 volts and is, in almost all instances, less than the forward bias voltage drop across a diode (e.g., 0.6 volts) within conventional charge control circuits.

It will be appreciated to those skilled in the art having the benefit of this disclosure that this invention is believed to be capable of applications with any portable electronic device. Furthermore, it is also to be understood that the form of the invention shown and described is to be taken as presently preferred embodiment. Various modifications and changes may be made to each and every electrical component as would be necessary to achieve suitable upper and lower voltage limits. Such changes would be obvious to a person skilled in the art having the benefit of this disclosure and would not depart from the spirit and scope of the invention as set forth in the claims. It is intended that the following claims be interpreted to embrace all such modifications and changes and, according, the specification and drawings are to be regarded in an illustrative rather than a restrictive sense.

What is claimed is:

1. A circuit for controlling charge upon an auxiliary battery comprising:

an auxiliary battery, a main battery and an ac-to-dc converter connected in parallel with each other and in parallel to a load device;

a main battery charge control circuit connected between said main battery and said ac-to-dc converter for providing a current from said ac-to-dc converter to said main battery;

an auxiliary battery charge control circuit connected between said auxiliary battery and said main battery for providing current from said main battery to said auxiliary battery and for modulating connectivity therebetween, said auxiliary battery charge control circuit comprises:

a pair of voltage dividers coupled between a ground potential and said main battery;

a pair of comparators, each comparator having an output connected to the other comparator output and a pair of inputs connected to a reference voltage and a respective one of said pair of voltage dividers, and wherein at least one of said pair of comparators comprises a power node coupled through a low pass filter to said main battery;

a switch transistor having a switch transistor base and a switch transistor conductive path, said switch transistor base is connected to said mutually coupled comparator outputs and said switch transistor conductive path is modulated by said switch transistor base and is connected between a current limiting resistor and said ground potential; and a battery connect transistor having a battery connect transistor base and a battery connect conductive path, said battery connect transistor base is connected through said current limiting resistor to said switch transistor conductive path, and wherein said battery connect conductive path is connected between said auxiliary battery and said main battery, whereby changes in conductivity of said switch transistor conductive path correspondingly cause changes in connectivity between said auxiliary battery and said main battery.

2. A circuit for charging and discharging an auxiliary battery and for disconnecting said auxiliary battery from a main battery, comprising:

an auxiliary battery and a main battery connected in parallel to a load device;

a series connected diode and resistor connected between said auxiliary battery and said main battery for charging said auxiliary battery from said main battery during times in which a voltage upon said main battery exceeds by a threshold amount a voltage upon said auxiliary battery;

an auxiliary battery charge control circuit connected between said main battery and said auxiliary battery for disconnecting said auxiliary battery from said main battery during times in which a voltage upon said main battery exceeds a threshold mount above the voltage upon said auxiliary battery and is less than a threshold mount above a ground potential; said auxiliary battery charge control circuit comprises:

a first and a second voltage divider coupled in parallel between said ground potential and said main battery;

a first and a second comparator having a mutually coupled output, said first comparator includes an inverting input adapted to receive a first divided voltage from said first voltage divider and said second comparator includes a non-inverting input adapted to receive a second divided voltage from said second voltage divider, wherein said first divided voltage is less than said second divided voltage;

a switch transistor having a switch transistor base and a switch transistor conductive path, said switch transistor base is connected to said mutually coupled comparator output and said switch transistor conductive path is modulated by said switch transistor base and is connected between a current limiting resistor and said ground potential; and a battery connect transistor having a battery connect transistor base and a battery connect conductive path, said battery connect transistor base is connected through said current limiting resistor to said switch transistor conductive path, and wherein said battery connect conductive path is connected between said auxiliary battery and said main battery, whereby changes in conductivity of said switch transistor conductive path correspondingly cause changes in connectivity between said auxiliary battery and said main battery.

3. The circuit as recited in claim 2, wherein said auxiliary battery charge control circuit achieves maximum connectivity between said auxiliary battery and said main battery during times in which said first divided voltage and said second divided voltage are less than and greater than, respectively, said reference voltage.

4. The circuit as recited in claim 2, wherein at least one of said pair of comparators comprises a power node coupled through a low pass filter to said main battery.

5. The circuit as recited in claim 2, wherein said auxiliary battery comprises five batteries connected in series, each battery is 1.2 volts nominal.

6. The circuit as recited in claim 2, wherein said main battery comprises ten batteries connected in series, each battery is 1.2 volts nominal.

7. The circuit as recited in claim 2, wherein said switch transistor comprises an npn bipolar transistor having the emitter connected to said ground potential.

8. The circuit as recited in claim 2, wherein said battery connect transistor comprises a pnp bipolar transistor having the emitter connected to said auxiliary battery and the collector connected to said main battery.

* * * * *

UNITED STATES PATENT AND TRADEMARK OFFICE
CERTIFICATE OF CORRECTION

PATENT NO. : 5,668,463

DATED : September 16, 1997

INVENTOR(S) : Raymond S. Duley

It is certified that error appears in the above-identified patent and that said Letters Patent is hereby corrected as shown below:

Claim 2, col. 8, line 5, please replace the word "mount" with the word "amount".
Claim 2, col. 8, line 7, please replace the word "mount" with the word "amount".

Signed and Sealed this

Thirtieth Day of December, 1997

Attest:

BRUCE LEHMAN

Attesting Officer     Commissioner of Patents and Trademarks